United States Patent
Suzuki et al.

(10) Patent No.: US 6,736,576 B2
(45) Date of Patent: May 18, 2004

(54) NUT DISENGAGEMENT PREVENTION STRUCTURE AND BATTERY TERMINAL INCORPORATING SAME

(75) Inventors: Katsuya Suzuki, Susono (JP); Gaku Fujii, Susono (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/201,953

(22) Filed: Jul. 25, 2002

(65) Prior Publication Data

US 2003/0021651 A1 Jan. 30, 2003

(30) Foreign Application Priority Data

Jul. 26, 2001 (JP) .................... P2001-226153

(51) Int. Cl.[7] .............. F16B 39/30; F16B 39/02
(52) U.S. Cl. ............. 411/307; 411/415; 411/938
(58) Field of Search .................... 411/305, 307, 411/308, 309, 310, 311, 411, 415, 938

(56) References Cited

U.S. PATENT DOCUMENTS

| 2,383,231 A | * | 8/1945 | Anderton | 411/308 |
| 3,381,733 A | * | 5/1968 | Stanwick | 411/311 |
| 6,349,466 B1 | * | 2/2002 | Redler et al. | 29/825 |

FOREIGN PATENT DOCUMENTS

JP        10-61647      3/1998

\* cited by examiner

*Primary Examiner*—Heather Shackelford
*Assistant Examiner*—Lisa M. Saldano
(74) *Attorney, Agent, or Firm*—Sughrue Mion, PLLC

(57) ABSTRACT

In a nut disengagement prevention structure, a bolt has an external thread. A nut which is thread on the bolt has an internal thread. A thread portion which is the closest to a leading end of the bolt has a first minor diameter. Any other portion of the thread of the bolt has a second minor diameter which is smaller than the first minor diameter. The second minor diameter is substantially identical with a minor diameter of the internal thread of the nut.

8 Claims, 2 Drawing Sheets

NUT DISENGAGEMENT PREVENTION STRUCTURE AND BATTERY TERMINAL INCORPORATING SAME

BACKGROUND OF THE INVENTION

This invention relates to a nut disengagement prevention structure, and more particularly to a nut disengagement prevention structure of the type in which a nut, once threaded onto a bolt, is held against withdrawal unless an artificial external force is exerted on the nut.

For example, for connecting a battery cord 3 to an electrode 2 of a battery 1 mounted on an automobile, an annular connection portion 4a of a battery terminal 4, press-fastened to a distal end of the battery cord 3, is fitted on the electrode 2, and then a bolt 5 is passed through passage holes 4c, formed respectively through a pair of clamping piece portions 4b and 4b, and is tightened to be fastened, together with a washer 6, to a nut 7. As a result, the annular connection portion 4a is deformed to be reduced in diameter through the pair of clamping piece portions 4b and 4b, so that the battery terminal 4 is fixedly secured to the electrode 2.

For effecting the above operation in the vehicle-assembling process, the bolt 5, passed through the passage holes 4c, is beforehand loosely tightened relative to the nut 7. Namely, the battery terminal 4, having the bolt 5 and the nut 7 beforehand connected thereto in an integrated manner, is fed to a production line where the nut and the bolt are finally completely fastened together.

In such form of use, however, the nut 7 is often disengaged from the bolt 5 by vibrations, an impact and the like during the transport of the battery terminal 4, and the nut 7 need to be again attached to the bolt, and in some cases the nut is lost.

Therefore, there has been proposed a nut disengagement prevention structure (disclosed, for example, in JP-A-10-61647) for preventing the disengagement of a nut from a bolt, in which an E-ring or a retaining cap is fitted on a distal end of the bolt, or an internal thread portion is formed in the distal end of the bolt, and a small screw, having a head larger in diameter than a thread ridge, is threaded into this internal thread portion, or an enlarged-diameter portion is formed at the distal end of the bolt by an expanding slot or a stamped section.

Another nut disengagement prevention structure is provided by coating, for example, a coating material, an adhesive or the like onto the distal end of the bolt.

In the above nut disengagement prevention structures, however, the pre-processing step for the bolt or the post-processing step, such as the operation for attaching the retaining member to the bolt after the bolt is threaded into the nut, the diameter-enlarging operation, or the coating operation, is added, and therefore there were encountered problems that the mounting operation is troublesome, and required much time and labor, and that the production cost increased because of the increased number of the component parts.

SUMMARY OF THE INVENTION

It is therefore an object of the present invention to provide a nut disengagement prevention structure and a battery terminal incorporating the same, in which the disengagement of a nut can be easily prevented with the simple structure.

In order to achieve the above object, according to the present invention, there is provided a nut disengagement prevention structure comprising:

a bolt, having an external thread; and a nut, thread on the bolt, having an internal thread;

wherein the thread portion which is the closest to a leading end of the bolt has a first minor diameter;

wherein any other portion of the thread of the bolt has a second minor diameter which is smaller than the first minor diameter; and wherein the second minor diameter is substantially identical with a minor diameter of the internal thread of the nut.

In this construction, when the bolt is tightened relative to the nut with a turning torque of above a predetermined value, the nut is threaded toward a proximal end of the bolt, while an internal thread of the nut and the thread portion which is the closest to a leading end of the bolt, engaged with each other, are resiliently deformed.

The second minor diameter of the any other portion of the thread of the bolt is substantially identical with the minor diameter of the internal thread of the nut, and therefore an ordinary tightening operation can be effected.

Therefore, the nut, once threaded onto the proximal end of the bolt, is held against withdrawal from the bolt unless a turning torque of above a predetermined value is artificially exerted on the nut.

According to the present invention, there is also provided a nut disengagement prevention structure comprising:

a bolt, having an external thread; and a nut, thread on the bolt, having an internal thread;

wherein the thread portion which is the closest to a leading end of the bolt has a first major diameter;

wherein any other portion of the thread of the bolt has a second major diameter which is smaller than the first major diameter; and wherein the second major diameter is substantially identical with a major diameter of the internal thread of the nut.

In this construction, when the bolt is tightened relative to the nut with a turning torque of above a predetermined value, the nut is threaded toward a proximal end of the bolt, while an internal thread of the nut and the thread portion which is the closest to a leading end of the bolt, engaged with each other, are resiliently deformed.

The second major diameter of the any other portion of the thread of the bolt is substantially identical with the major diameter of the internal thread of the nut, and therefore an ordinary tightening operation can be effected.

Therefore, the nut, once threaded onto the proximal end of the thread portion of the bolt, is held against withdrawal from the bolt unless a turning torque of above a predetermined value is artificially exerted on the nut.

According to the present invention, there is also provided a nut disengagement prevention structure comprising:

a bolt, having an external thread; and a nut, thread on the bolt, having an internal thread;

wherein adjacent thread portions which are closest to a leading end of the bolt are provided with a first pitch;

wherein each of any other adjacent thread portions of the bolt are provided with a second pitch which is different from the first pitch; and wherein the second pitch is substantially identical with a pitch of each adjacent thread portions of the nut.

In this construction, when the bolt is tightened relative to the nut with a turning torque of above a predetermined value, the nut is threaded toward a proximal end of the bolt while an internal thread of the nut and the thread portion which is the closest to the leading end of the bolt, engaged with each other, are resiliently deformed.

The second pitch each of the any other adjacent thread portions of the bolt is substantially identical with the pitch of each adjacent thread portions of the nut, and therefore an ordinary tightening operation can be effected.

Therefore, the nut, once threaded onto the proximal end of the thread portion of the bolt, is held against withdrawal from the bolt unless a turning torque of above a predetermined value is artificially exerted on the nut.

Namely, in the bolt having the above nut disengagement prevention structures, only the thread portion which is the closest to the leading end of the bolt need to be formed into a thread configuration slightly different from the specification dimension during an ordinary bolt-producing process, and any special pre-processing step, such as the formation of an expanding slot or a stamped portion at the distal end of the bolt, and any post-processing step, such as the mounting of a retaining member, as used in the related technique, are not necessary, and the number of the component parts will not increase.

Therefore, there can be provided the inexpensive nut disengagement prevention structure in which the disengagement of the nut can be easily prevented with the simple structure.

According to the present invention, there is also provided a battery terminal comprising:
  a connection member, fitted with a battery post of a battery;
  a pair of clamping portions, extended respectively from both ends of the connecting portion;
  a bolt, having an external thread; and
  a nut, thread on the bolt, having an internal thread;
  wherein the thread portion which is the closest to a leading end of the bolt has a first minor diameter;
  wherein any other portion of the thread of the bolt has a second minor diameter which is smaller than the first minor diameter; and
  wherein the second minor diameter is substantially identical with a minor diameter of the internal thread of the nut.

According to the present invention, there is also provided a battery terminal comprising:
  a connection member, fitted with a battery post of a battery;
  a pair of clamping portions, extended respectively from both ends of the connecting portion;
  a bolt, having an external thread; and
  a nut, thread on the bolt, having an internal thread;
  wherein the thread portion which is the closest to a leading end of the bolt has a first major diameter;
  wherein any other portion of the thread of the bolt has a second major diameter which is smaller than the first major diameter; and
  wherein the second major diameter is substantially identical with a major diameter of the internal thread of the nut.

According to the present invention, there is also provided a battery terminal comprising:
  a connection member, fitted with a battery post of a battery;
  a pair of clamping portions, extended respectively from both ends of the connecting portion;
  a bolt, having an external thread; and
  a nut, thread on the bolt, having an internal thread;
  wherein adjacent thread portions which are closest to a leading end of the bolt are provided with a first pitch;
  wherein each of any other adjacent thread portions of the bolt are provided with a second pitch which is different from the first pitch; and
  wherein the second pitch is substantially identical with a pitch of each adjacent thread portions of the nut.

In the constructions, the bolt and the nut, beforehand connected to the battery terminal in an integrated manner, will not be disengaged from each other by vibrations, an impact or the like during the transport before this battery terminal is fed to a production line where the nut and the bolt are finally completely fastened together.

Therefore, the battery terminal, incorporated with the bolt and the nut connected thereto in an integrated manner, can be positively stored as one part, and the cost for the parts management can be reduced.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

One preferred embodiment of a nut disengagement prevention structure according to the present invention will now be described bellow in detail with reference to the accompanying drawings.

Figure 1:
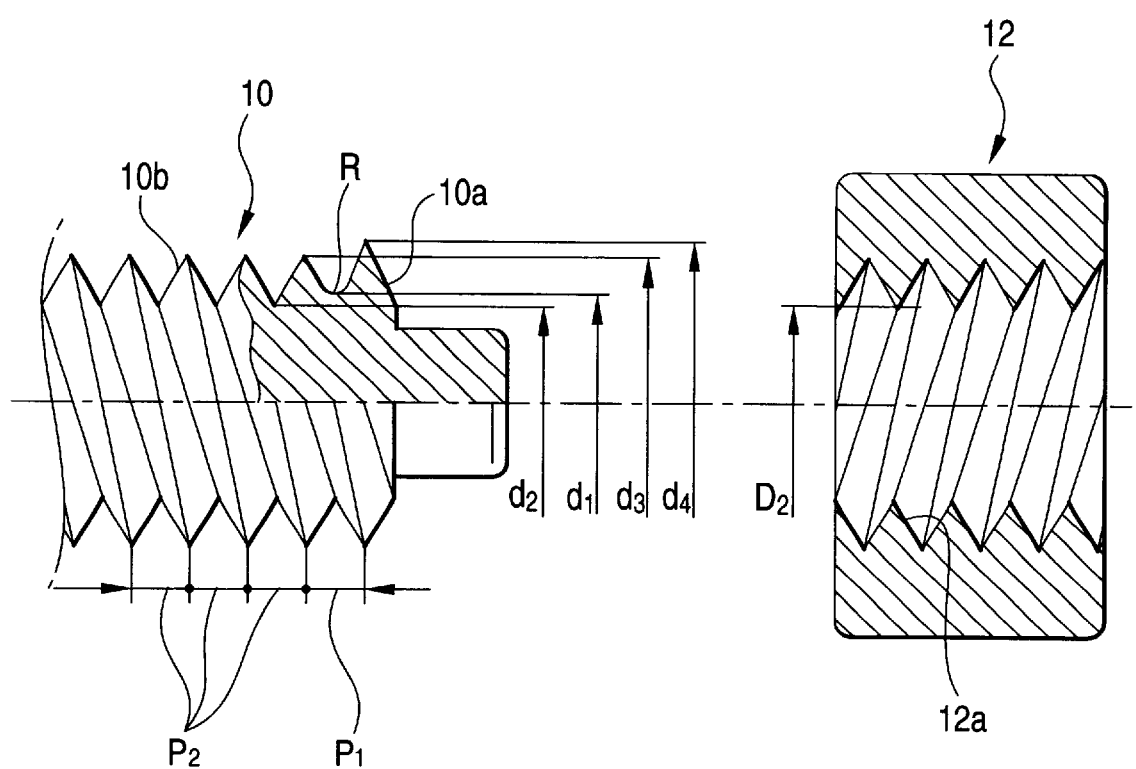
FIG. 1 is an enlarged, cross-sectional view showing an important portion of one preferred embodiment of a nut disengagement prevention structure of the present invention.

Dimensions of a bolt 10 of this embodiment are so determined that a root diameter (minor diameter) $d_1$ of an external thread 10a at a distal end of a thread portion of the bolt 10 is larger than a root diameter $d_2$ of an external thread 10b at a proximal-side portion (left side portion in FIG. 1) of the thread portion of the bolt, as shown in FIG. 1.

A nut 12 for being threaded on the bolt 10 has an internal thread 12a having an inner diameter $D_2$ corresponding to the root diameter $d_2$ of the external thread 10b at the proximal-side portion of the thread portion of the bolt 10.

The root diameter $d_1$ of the external thread 10a at the distal end of the thread portion of the bolt 10 is larger than the inner diameter $D_2$ of the internal thread 12a of the nut 12 for being threaded on the bolt 10, and the external thread 10a is formed into such a slightly-different thread configuration as to provide a tighter threaded engagement as compared with the root diameter $d_2$ (which is the proper specification dimension) of the external thread 10b (at the proximal-side portion of the thread portion) corresponding to the internal thread 12a of the nut 12.

Namely, when the bolt 10 is tightened relative to the nut 12 with a turning torque of above a predetermined value, the nut 12 is threaded toward the proximal-side portion of the thread portion of the bolt 10 while the crest of the internal thread 12a is resiliently deformed at a root R of the external thread 10a at the distal end of the thread portion of the bolt. Then, when the internal thread 12a of the nut 12 reaches the external thread 10b at the proximal-side portion of the thread portion of the bolt 10, the threaded condition of the nut 12 and bolt 10 becomes normal.

Therefore, the nut 12, once threaded onto the proximal-side portion of the thread portion of the bolt 10, is held against withdrawal from the bolt 10 unless a turning torque of above the predetermined value is artificially exerted on the nut 12.

Figure 2:
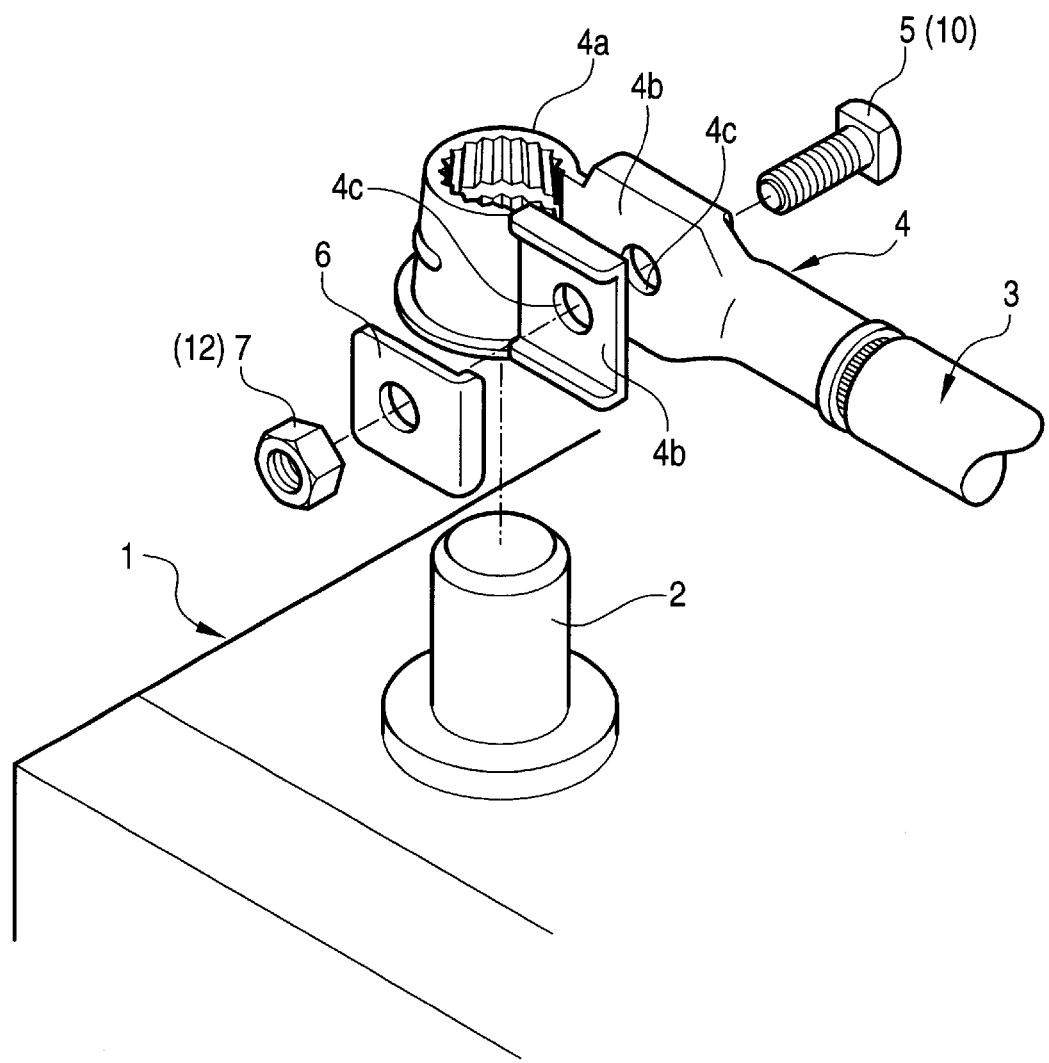
FIG. 2 is a perspective view showing the structure of mounting a battery terminal on an electrode of a battery.

Therefore, for example, in the case of the battery terminal 4 (shown in FIG. 2) in which the nut is beforehand loosely tightened relative to the bolt, if a battery terminal, having the bolt 10 and the nut 12 connected thereto in an integrated manner, is used instead of using the related bolt 5 and nut 7, the nut 12 will not be disengaged from the bolt 10 by vibrations, an impact or the like during the transport, and the nut 12 does not need to be again attached to the bolt, or will not be lost.

Therefore, the battery terminal, having the bolt 10 and the nut 12 connected thereto in an integrated manner, can be positively stored as one part, and the cost for the parts management can be reduced.

The root diameter $d_2$ of the external thread 10b at the proximal-side portion of the thread portion of the bolt 10 is the specification dimension corresponding to the inner diameter $D_2$ of the internal thread 12a of the nut 12. For example, in the case where the battery terminal, having the bolt 10 and the nut 12 beforehand connected thereto in an integrated manner as described above, is fed to the production line, and is finally completely fastened to the electrode, this fastening operation can be carried out totally in the same manner as the ordinary fastening operation.

In the bolt 10 having the structure for preventing the disengagement of the nut 12, it is merely necessary to produce this bolt 10 during an ordinary production process in such a manner that only the root diameter $d_1$ of the external thread 10a at the distal end of the thread portion is slightly longer than the root diameter $d_2$ (which is the specification dimension) of the external thread 10b at the proximal-side portion of the thread portion, and any special pre-processing step, such as the formation of an expanding slot or a stamped portion at the distal end of the bolt, and any post-processing step, such as the mounting of a retaining member, as used in the conventional technique, are not necessary, and the number of the component parts will not increase.

Therefore, the production cost will not increase, and the disengagement of the nut can be easily prevented with the simple structure.

In the above embodiment, the root diameter $d_1$ of the external thread 10a at the distal end of the thread portion of the bolt 10 is larger than the root diameter $d_2$ (which is the proper specification dimension) of the external thread 10b at the proximal-side portion of the thread portion, and with this construction, the external thread 10a is formed into such a slightly-different thread configuration as to provide a tighter threaded engagement relative to the inner diameter $D_2$ of the internal thread 12a of the nut 12. However, the nut disengagement prevention structure of this invention is not limited to this embodiment, and within the scope of the invention, the distal end of the thread portion of the bolt can be formed into any other suitable, slightly-different thread configuration which can provide a tighter threaded engagement relative to the internal thread of the nut.

In FIG. 1, for example, the outer diameter $d_4$ of the external thread 10a at the distal end of the thread portion of the bolt 10 may be made larger than the outer diameter $d_3$ (the proper specification dimension) of the external thread 10b at the proximal-side portion of the thread portion, or the pitch $P_1$ of the external thread 10a at the distal end of the thread portion of the bolt 10 may be made larger or smaller than the pitch $P_2$ (the proper specification dimension) of the external thread 10b at the proximal-side portion of the thread portion, and by doing so, the distal end of the thread portion of the bolt 10 can be formed into such various slightly-different thread configurations as to provide the tighter threaded engagement relative to the internal thread 12a of the nut 12.

The nut disengagement prevention structure of the present invention is not limited to the bolt-nut assembly for the above battery terminal, but can be applied to any other suitable bolt-nut assembly in so far as the nut can be beforehand provisionally mounted on the bolt.

What is claimed is:

1. A nut disengagement prevention structure comprising:
 a bolt, having an external thread; and
 a nut, thread on the bolt, having an internal thread;
 wherein the thread portion which is the closest to a leading end of the bolt has a first minor diameter;
 wherein any other portion of the thread of the bolt has a second minor diameter which is smaller than the first minor diameter;
 wherein the second minor diameter is substantially identical with a minor diameter of the internal thread of the nut, and
 wherein the thread portion having the first minor diameter has a first major diameter which is larger than a second major diameter of the any other portion of the thread of the bolt having the second minor diameter.

2. A nut disengagement prevention structure comprising:
 a bolt, having an external thread; and
 a nut, thread on the bolt, having an internal thread;
 wherein the thread portion which is the closest to a leading end of the bolt has a first major diameter;
 wherein any other portion of the thread of the bolt has a second major diameter which is smaller than the first major diameter; and
 wherein the second major diameter is substantially identical with a major diameter of the internal thread of the nut.

3. The nut disengagement prevention structure according to claim 2, wherein the major diameter of the internal thread of the nut is not substantially identical to the first major diameter.

4. The nut disengagement prevention structure according to claim 2, wherein all other portions of the thread of the bolt, other than the thread portion which is closest to the leading end of the bolt, has the second major diameter.

5. A nut disengagement prevention structure comprising:
 a bolt, having an external thread; and
 a nut, thread on the bolt, having an internal thread;
 wherein adjacent thread portions which are closest to a leading end of the bolt are provided with a first pitch;
 wherein each of any other adjacent thread portions of the bolt are provided with a second pitch which is different from the first pitch; and
 wherein the second pitch is substantially identical with a pitch of each adjacent thread portions of the nut.

6. A battery terminal comprising:

a connection member, fitted with a battery post of a battery;

a pair of clamping portions, extended respectively from both ends of the connecting portion;

a bolt, having an external thread; and a nut, thread on the bolt, having an internal thread;

wherein the thread portion which is the closest to a leading end of the bolt has a first minor diameter;

wherein any other portion of the thread of the bolt has a second minor diameter which is smaller than the first minor diameter;

wherein the second minor diameter is substantially identical with a minor diameter of the internal thread of the nut, and wherein the thread portion having the first minor diameter has a first major diameter which is larger than a second major diameter of the any other portion of the thread of the bolt having the second minor diameter.

7. A battery terminal comprising:

a connection member, fitted with a battery post of a battery;

a pair of clamping portions, extended respectively from both ends of the connecting portion;

a bolt, having an external thread; and a nut, thread on the bolt, having an internal thread;

wherein the thread portion which is the closest to a leading end of the bolt has a first major diameter;

wherein any other portion of the thread of the bolt has a second major diameter which is smaller than the first major diameter; and wherein the second major diameter is substantially identical with a major diameter of the internal thread of the nut.

8. A battery terminal comprising:

a connection member, fitted with a battery post of a battery;

a pair of clamping portions, extended respectively from both ends of the connecting portion;

a bolt, having an external thread; and a nut, thread on the bolt, having an internal thread;

wherein adjacent thread portions which are closest to a leading end of the bolt are provided with a first pitch wherein each of any other adjacent thread portions of the bolt are provided with a second pitch which is different from the first pitch; and wherein the second pitch is substantially identical with a pitch of each adjacent thread portions of the nut.

* * * * *